US006276319B2

(12) United States Patent
Walter et al.

(10) Patent No.: US 6,276,319 B2
(45) **Date of Patent: *Aug. 21, 2001**

(54) METHOD FOR EVALUATING THE MARCH OF PRESSURE IN A COMBUSTION CHAMBER

(75) Inventors: Klaus Walter, Bietigheim-Bissingen; Holger Bellmann, Ludwigsburg, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,304

(22) PCT Filed: Sep. 22, 1998

(86) PCT No.: PCT/DE98/02809

§ 371 Date: Mar. 23, 2000

§ 102(e) Date: Mar. 23, 2000

(87) PCT Pub. No.: WO99/15872

PCT Pub. Date: Apr. 1, 1999

(30) Foreign Application Priority Data

Sep. 23, 1997 (DE) ............................................. 197 41 820

(51) Int. Cl.[7] .................................................... G01M 15/00

(52) U.S. Cl. ..................... 123/90.15; 123/90.1; 123/435; 73/117.3

(58) Field of Search ............................... 123/90.1, 90.11, 123/90.12, 90.14, 90.15, 435; 73/117.2, 117.3

(56) References Cited

U.S. PATENT DOCUMENTS

| | | | | |
|---|---|---|---|---|
| 4,633,707 | | 1/1987 | Haddox | 73/47 |
| 4,739,649 | | 4/1988 | Tanaka | 73/115 |
| 4,802,454 | | 2/1989 | Tanaka | 123/425 |
| 5,024,191 | * | 6/1991 | Nagahiro et al. | 123/198 D |
| 5,623,412 | | 4/1997 | Masson | 364/431.03 |
| 5,845,613 | * | 12/1998 | Yoshikawa | 123/90.15 |
| 6,055,948 | * | 5/2000 | Shiraishi et al. | 123/90.15 |
| 6,073,596 | * | 6/2000 | Kemper | 123/90.11 |

FOREIGN PATENT DOCUMENTS

| | | |
|---|---|---|
| 641907 | 3/1984 | (CH) . |
| 3721010 | 1/1988 | (DE) . |

* cited by examiner

*Primary Examiner*—Weilun Lo
(74) *Attorney, Agent, or Firm*—Michael J. Striker

(57) ABSTRACT

A method for evaluating the combustion chamber pressure in an internal combustion engine is described, in which the output signal of at least one cylinder pressure sensor and one crankshaft angle sensor is performed by the control unit of the engine. By analysis of the course of combustion chamber pressure over the crankshaft angle, characteristic pressure courses are obtained for certain valve control times. From these characteristic pressure courses, a conclusion can be drawn as to the valve control times "outlet opens", "outlet closes", "inlet opens", and "inlet closes", referred to the crankshaft angle.

15 Claims, 5 Drawing Sheets

METHOD FOR EVALUATING THE MARCH OF PRESSURE IN A COMBUSTION CHAMBER

BACKGROUND OF THE INVENTION

The invention relates to a method for evaluating the course of the combustion chamber pressure and internal combustion engines.

It is known to ascertain the course of the combustion chamber pressures in the cylinders of an internal combustion engine with the aid of suitable sensors, and from this course to detect operating states of the engine and obtain trigger signals for controlling the engine. Typically, each cylinder of the engine is assigned a combustion chamber pressure sensor. A crankshaft sensor is also used, which furnishes an output signal that is representative for the crankshaft position. The two signals are evaluated jointly in the engine control unit. A camshaft sensor is no longer needed, since it is possible, especially after starting, to synchronize the crankshaft and camshaft position by linking the course of the combustion chamber pressure and the crankshaft sensor signal. A method in which the course of combustion chamber pressure is evaluated as a function of the crankshaft position, for the sake of cylinder detection and to generate signals required for ignition, is known from published, unexamined German Patent Application DE-OS 44 05 015. The cylinder detection and the detection of the crankshaft revolution in which the engine is located in a combustion cycle is performed in the known method by evaluating the pressure increase in a certain cylinder, for instance, and distinguishing between a pressure increase in the compression stroke and a pressure increase in the ensuing combustion. Since these values are different, the crankshaft revolution in which the engine is located can be ascertained. From this finding, control signals for the engine can be generated.

In the known method, an evaluation of the course of combustion chamber pressure to detect the valve control times, that is, in order to detect whether the outlet valve is opening or closing or whether the inlet valve is opening or closing, is not performed.

SUMMARY OF THE INVENTION

In keeping with these objects in accordance with the present invention a method for evaluating a combustion chamber pressure in an internal combustion engine includes performing measurements during normal engine operations, and evaluating incident combustion chamber pressure courses or events which depend on the combustion chamber pressure course and which characterize the valve control times.

The method of the invention has the advantage over the prior art that precise analysis of the course of combustion chamber pressure is performed, so that the valve control times can be ascertained with reference to the crankshaft position. To that end, characteristic events are evaluated from which unambiguously determined valve control times can be detected. For the valve control times of "outlet opens", "outlet closes", "inlet opens", "inlet closes", characteristic pressure courses are obtained which according to the invention are advantageously extracted from the course of the combustion chamber pressure.

It is especially advantageous that various valve control times can be ascertained by detecting the various associated characteristic events. Some valve control times can also be detected from a similar evaluation of the course of the combustion chamber pressure. A comparison with engine-typical characteristic variables stored in memory makes it possible to determine valve control times for a specific engine.

Further processing of the combustion chamber pressure signal before further evaluation, such as a differentiation or integration of the course of combustion chamber pressure, makes further ascertainments of valve control times advantageously possible. Taking additional engine operating conditions into account, such as the incidence of knocking combustion, and the ensuing additional signal processing, such as averaging, advantageously makes it possible to ascertain valve control times even if difficult conditions or operating states of the engine are occurring.

DESCRIPTION OF THE DRAWING

One exemplary embodiment of the invention is shown in the drawing FIGS. and will be described in further detail in the ensuing description. Specifically.

DESCRIPTION OF THE PREFERRED EMBODIMENTS

Figure 1:
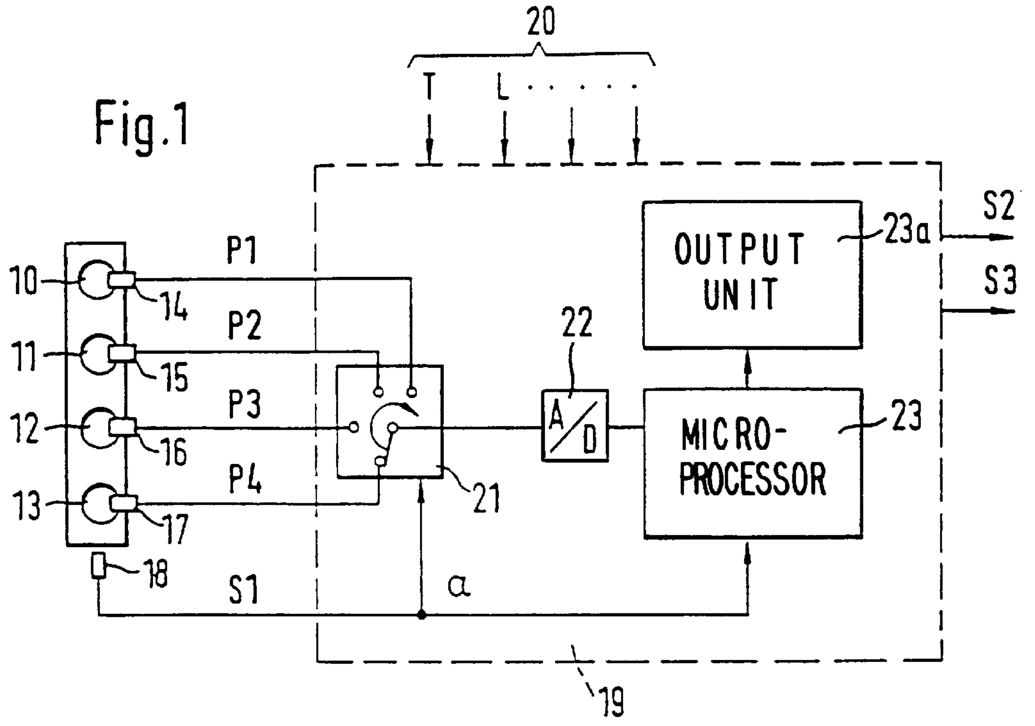
FIG. 1 shows a system, already known per se, for detecting the pressure course in the cylinders of an internal combustion engine.

In FIG. 1, the most essential components of an apparatus for ascertaining the combustion chamber pressure in each cylinder of an internal combustion engine are shown. In each of the cylinders 10, 11, 12 and 13 of a four-cylinder engine, respective cylinder pressure sensors 14, 15, 16 and 17 are disposed, which ascertain the pressure courses P1, P2, P3 and P4. A crankshaft sensor 18 is also present, which outputs an output signal S1 that is characteristic for the crankshaft position.

Both the output signals of the cylinder pressure sensors 14, 15, 16 and 17 and the output signal of the crankshaft sensor 18 are delivered to the engine control unit 19, which processes these signals. Via inputs 20, further signals (such as a temperature T, load L and so forth) can be supplied to the control unit and can be further processed in the control unit as well.

The control unit 19 includes a multiplexer 21, by way of which the output signal of the cylinder pressure sensors is sent selectively to an analog/digital converter 22. The switchover of the multiplexer 11 is done as a function of crankshaft angle and is tripped by suitable triggering actions on the part of the control unit 19. The actual evaluation of the signals is done in a microprocessor 23 of the control unit 19; via an output unit 23a, as a function of the variables ascertained, this microprocessor can output control signals S2 and S3, such as ignition or injection signals, to various components of the engine.

The signal processing takes place in the microprocessor 23 of the control unit 19, and on the basis of this processing, a conclusion can be drawn as to the valve control times, or the valve control times can be ascertained.

Figure 3:
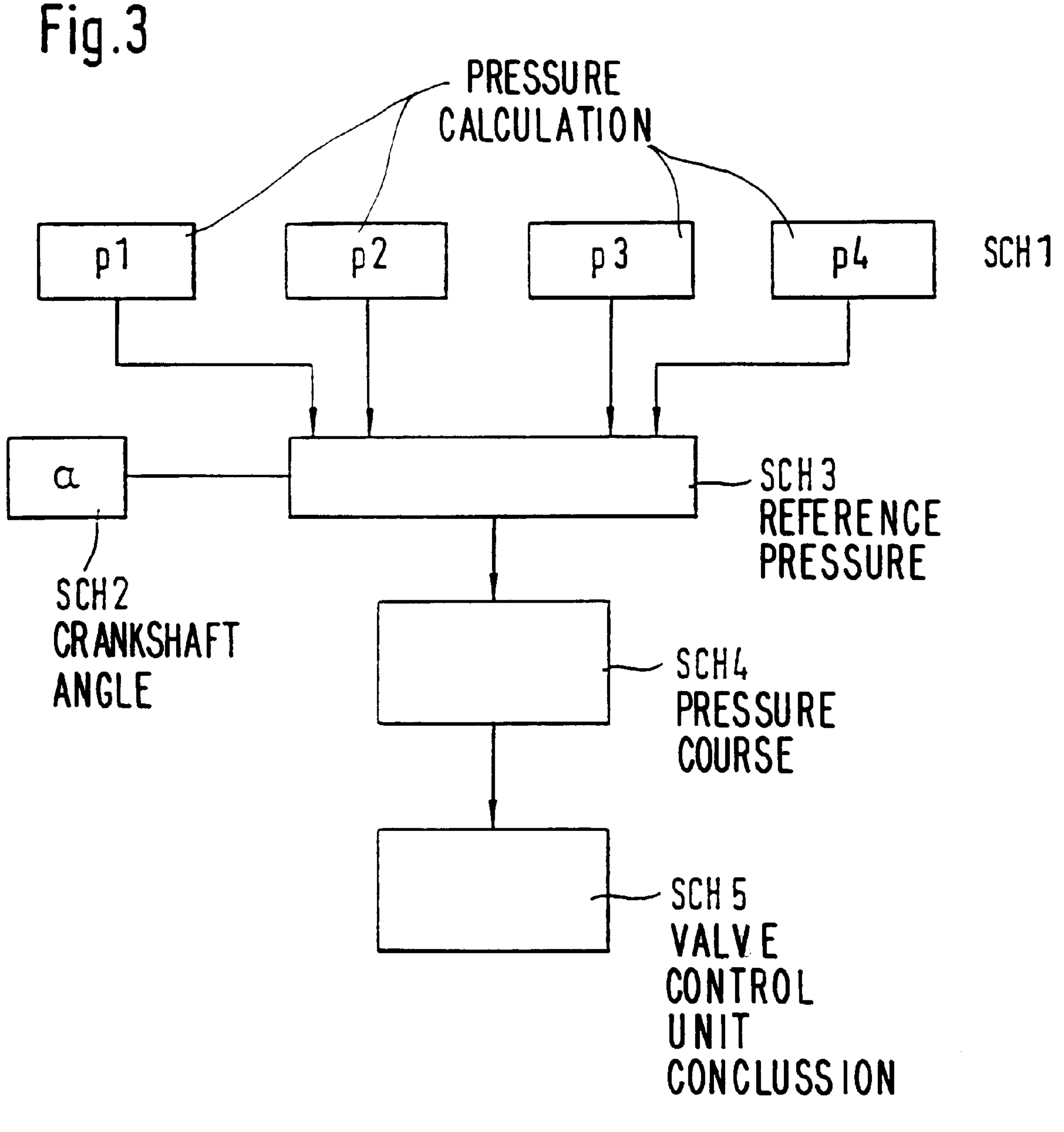
FIG. 3 is a flow chart of an evaluation method according to the invention.

FIG. 3 shows an evaluation flow chart, in which in step SCH 1 the pressure is calculated from the sensor signal. In step SCH 2, the crankshaft angle is written in, so that in step SCH 3 the reference pressure P( ) is present. In step SCH 4, the pressure course is evaluated, optionally taking data stored in memory into account, and in step SCH 5, a conclusion as to the applicable valve control unit is drawn.

Figure 1A:
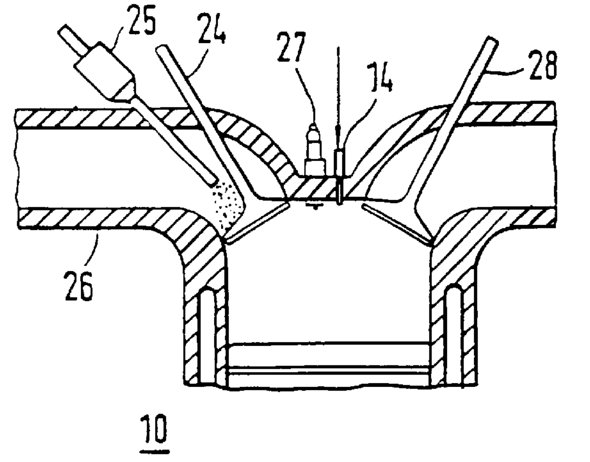
In FIG. 1a, relevant parts of the internal combustion engine are shown.

By opening the inlet valve 24, the fuel-air mixture is supplied to the cylinder of an engine, for instance to cylinder 10 (FIG. 1*a*). In a known manner, the fuel is injected by the injection valve 25 before the injection valve 24 into the intake tube 26, and ignited via the spark plug 27 and via the spark plug 27. Via an outlet valve 28, the gas generated in the cylinder can be let out. The triggering of the inlet and outlet valves is done in a known manner with the aid of the camshaft or camshafts, not shown. The camshaft or camshafts are driven in a known manner by the crankshaft. The location of the camshaft or camshafts relative to the crankshaft can be varied by the control unit 19 as a function of rpm, by means of suitable trigger signals S3. By the detection according to the invention of the valve control times as a function of the crankshaft angle, the association between the camshaft position and the crankshaft position can be determined.

Figure 2:
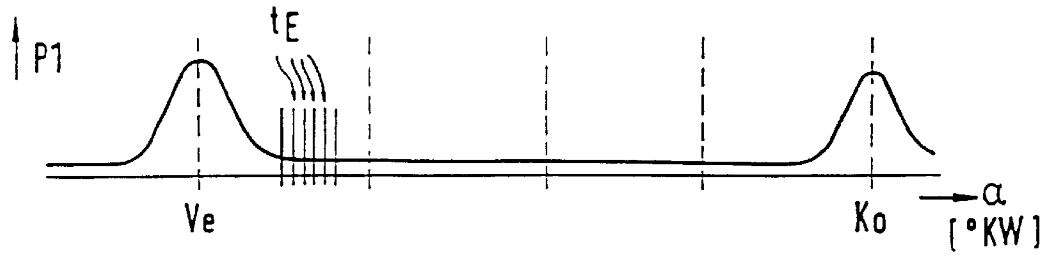
FIG. 2 shows a characteristic course of combustion chamber pressure over the crankshaft angle.

In FIG. 2, the course of the combustion chamber pressure P1 of the cylinder 10 is plotted over the crankshaft angle. The cylinder pressure attains two maximum values, which are one cycle or 720 KW apart. The maximum combustion chamber pressure in the range in which a combustion occurs is higher than in the range in which only a compression occurs. In the example of FIG. 2, a combustion takes place in the phase Ve. In the phase Ko only a compression occurs.

The combustion chamber pressure course schematically shown in FIG. 2 is evaluated according to the invention by various criteria, in order from them to draw conclusions as to events that are characteristic for the camshaft position relative to the crankshaft position and thus for the valve seat control times. One such event can for instance be the crankshaft position at which the inlet valve closes. Other valve control times are the control times designated as "outlet opens", "inlet opens", and "outlet closes". For each valve control time, there are characteristic or definitive features in the pressure course, the evaluation of which features will be described in further detail below.

Figure 4:
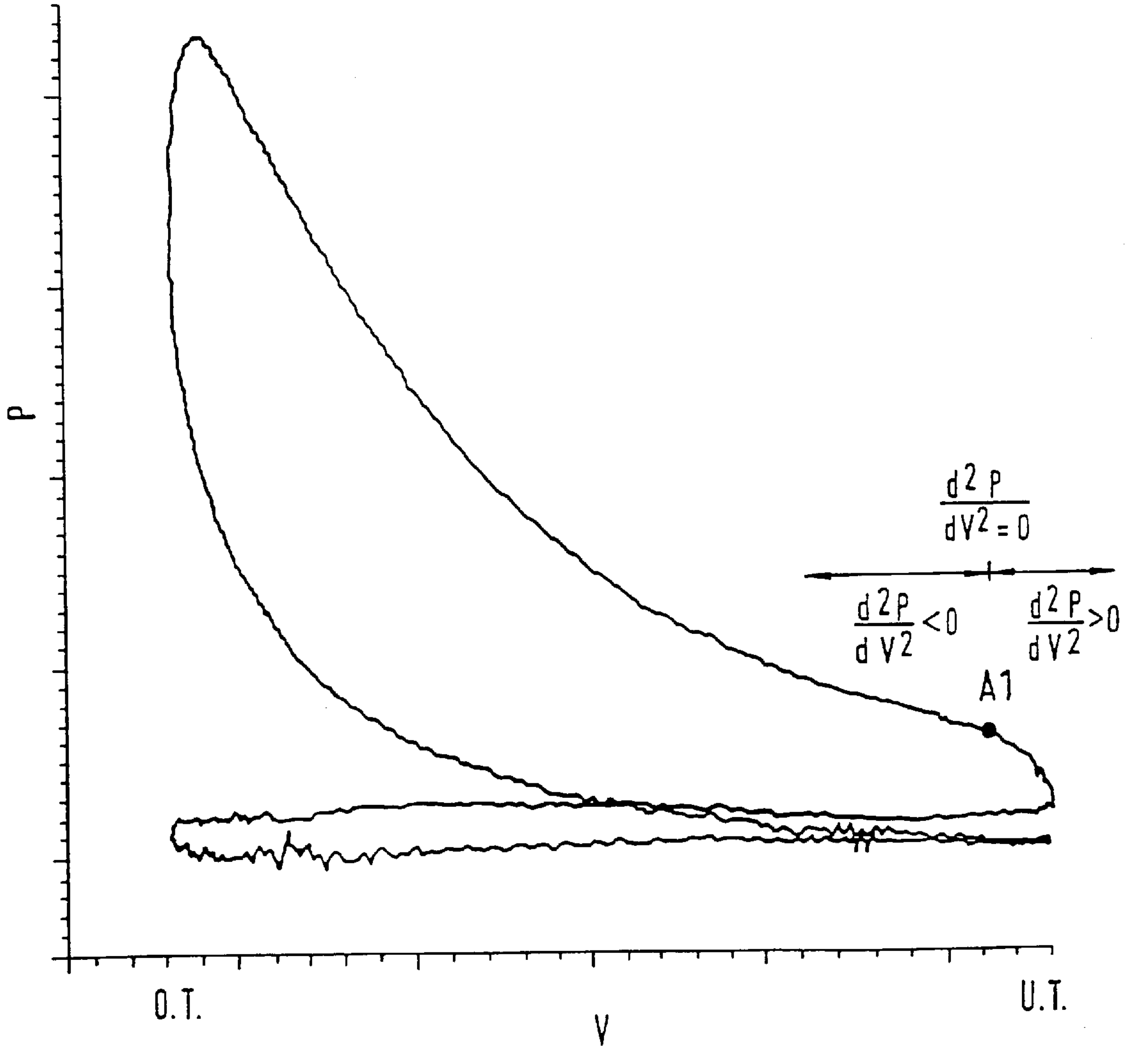
FIGS. 4, 5 and 6 show various relationships among the combustion chamber pressure, combustion chamber volume, and crankshaft angle.

To detect the valve control time "outlet opens", the expansion line of the combustion chamber pressure course can be evaluated. As long as the outlet valve is closed, the events occurring in the cylinder involve a thermodynamically closed system, so that the events can be calculated in accordance with thermodynamic principles. As the volume increases, a pressure decrease occurs, which is established similarly to a polytropic expansion. It is characteristic of this that the amount of the pressure gradient decreases with increasing volume. If the outlet valve is opened, then dictated by the pressure that is elevated relative to the environment, gas flows out of the cylinder. As a result, the amount of the pressure gradient increases. The evaluation of the pressure gradient for the outlet opening that has occurred can thus utilized as a definitive or characteristic behavior of the pressure course. If the pressure gradient has a behavior which is distinguished by a lessening decrease and a sudden increase in the amount of the pressure gradient then it can be concluded that the outlet has opened. Mathematically, the evaluation can be done by checking for instance for a change of sign in the second derivation of the pressure in accordance with the volume. If such a change of sign occurs in the second derivation of the pressure in accordance with the crankshaft angle, then it can be concluded that an outlet opening has taken place. In FIG. 4, which shows the relationship between the pressure P and the volume V between top dead center OT and bottom dead center UT, the point A1 would characterize the outlet opening that has occurred. At this point, it is true that the second derivation of the pressure in accordance with the volume $d^2P/dv$ has a change of sign. This is also true for the relationship $d^2P/d^2$.

Figure 5:
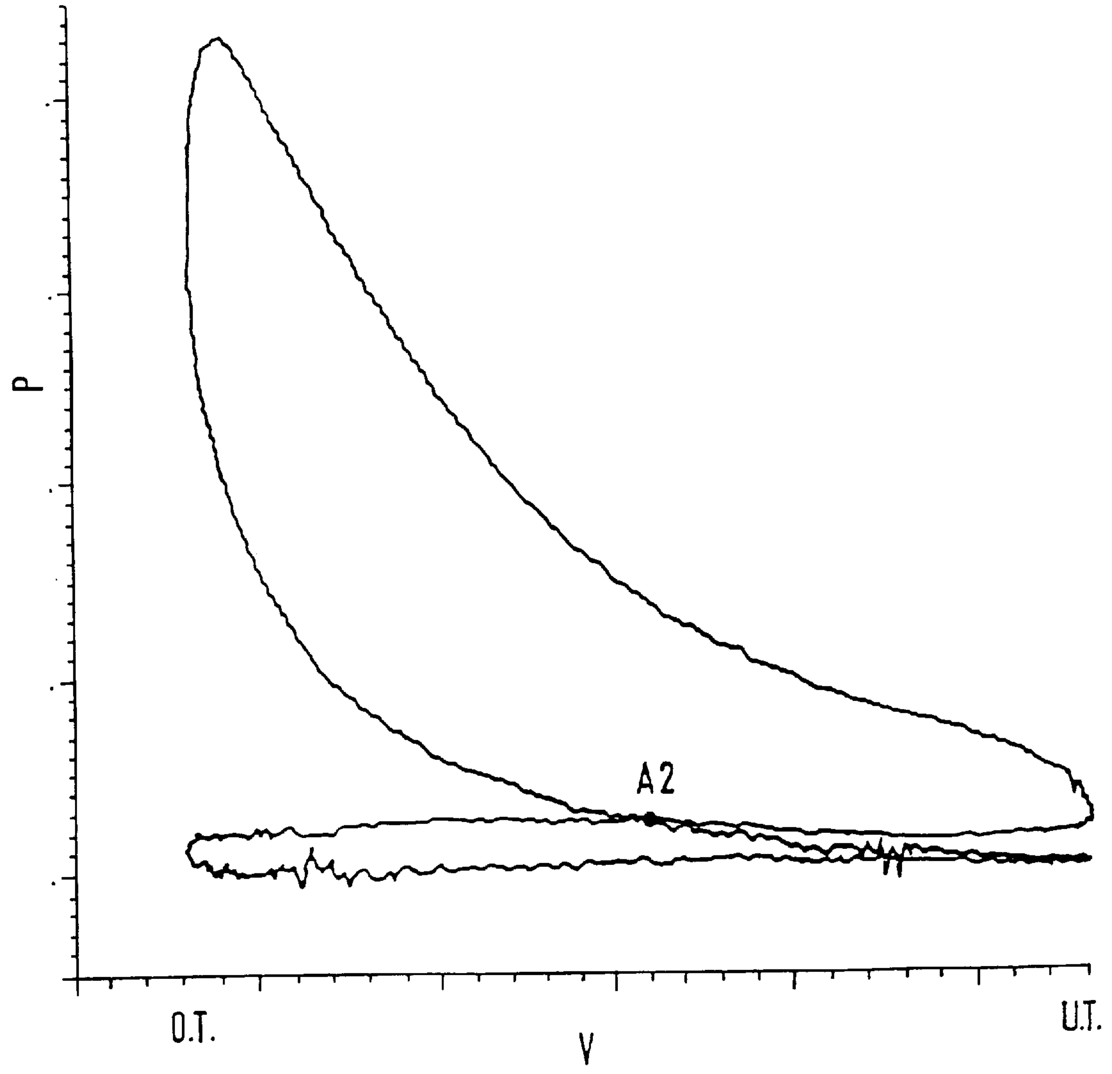

To detect the valve control time "inlet closes", the volume or the crankshaft angle at which the compression curve passes through a known, fixed level is detected. In the simplest case, this comparison level is obtained from the pressure course during expulsion. The location of the intersection A2 between the compression pressure course and the pressure course during the expulsion in the crankshaft angle pattern or the course of volume can be learned from FIG. 5. It is admittedly not a direct measure of the valve control time "inlet closes", but it does shift upon a change in the closure of the inlet valve. Thus a desired value for the location of point A2 can be applied in engine-dependent fashion as a function of the load and rpm. For a diagnosis, the deviation of the actual value for the point A2 from the desired value is then used. The recording of the engine-specific data can be done before the engine is put into operation, for instance on a test bench. The data obtained are then stored in memories, for instance of the control unit, which can access these data at any time.

Figure 6:
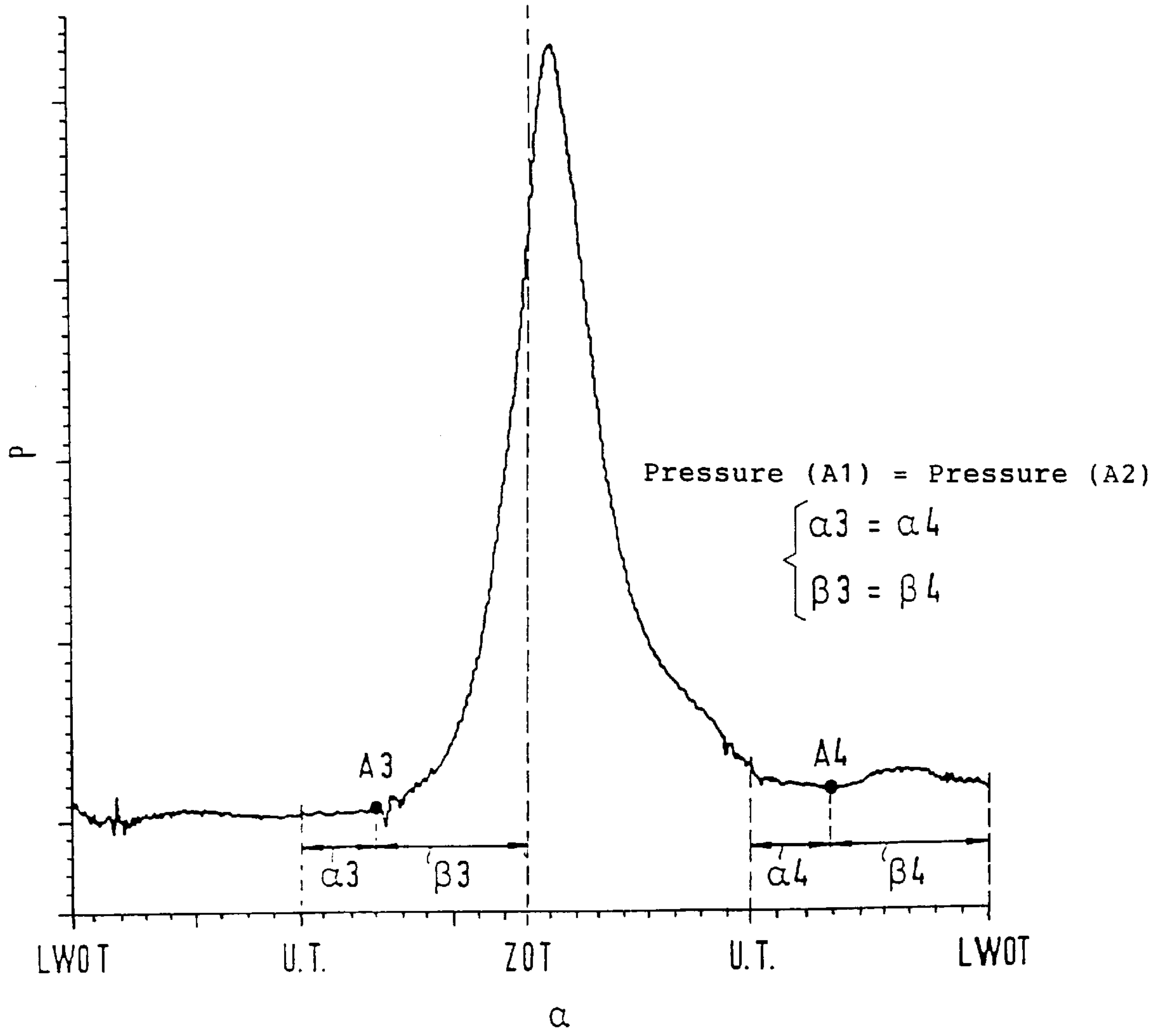

The evaluation of the course of combustion chamber pressure is not limited to only the pressure-volume relationship; an evaluation on the basis of the pressure and crankshaft angle relationship is also possible. By evaluating the location of points A3 and A4 in FIG. 6, corresponding conclusions can be drawn. Also plotted in FIG. 6 is the combustion chamber pressure P over the crankshaft angle. In addition, the load change top dead center points LWOT, an ignition top dead center point ZOT, bottom dead center points UT, and angles $\alpha3$, $\beta3$, $\alpha4$, $\beta4$ are plotted; the angle $\alpha3$ and $\alpha4$ respectively defines the distance between bottom dead center UT and the respective point A3 and A4; the angle $\beta3$ defines the distance between A3 and ZOT; and the angle $\beta4$ defines the distance between A4 and LWOT. If the pressure at point A3 is equal to the pressure at point A4, than for the angles the applicable equations are $\alpha3=\alpha4$ and $\beta3=\beta4$.

If it is not possible to evaluate the course of combustion chamber pressure during the expulsion of the combustion gases located in the cylinder, for instance if because of the high combustion temperature, from transient drifting caused by thermal shock, the combustion chamber pressure sensor furnishes only imprecise signals, then the evaluation of the course of combustion chamber pressure can also be performed as a substitute by comparison with the ambient pressure. For instance, to detect the valve control time "inlet valve closes inlet valve", the volume or the crankshaft angle at which the compression pressure is equal to the ambient pressure can be detected. In that case, the point A3 is defined as the intersection of the compression pressure course and the ambient pressure. Then, however, a zero level correction of the pressure course will be necessary, which increases the effort and expense of calculation and under some circumstances can lead to incorrect measurements.

If measurement values for the ambient pressure and the compression curve, which is the case in supercharged engines, for instance, than an evaluation of the combustion chamber pressure course can also be done on the basis of a fixed pressure value. In that case, however, special diagnostic strategies that prevent misdiagnosis from a strong change in the ambient pressure, for instance when driving at relatively high altitudes, are necessary. If the control unit detects this kind of high altitude travel, for instance in conjunction with other evaluations for regulating the engine, then a detection of valve control times can be suppressed at least intermittently.

If valve control times change, for instance because of a corresponding change in the camshaft positions, once again this leads to a change in the combustion chamber pressure course during the compression phase, the combustion phase, and the expansion phase. From a change in the camshaft position, the valve control times are for instance changed in such a way that the residual gas content in the cylinder charge varies in a characteristic way. A relatively high residual gas content, which can be caused for instance by late closure of the outlet valve or early opening of the inlet valve, in each case relative to the crankshaft angle, increases both the absolute pressure and the pressure gradient during the compression phase, assuming that the same quantity of fresh air is delivered. If the same instant of ignition is assumed, the combustion will begin late, with the attendant effects on the characteristic values that describe the combustion and the expansion. If various engine-specific characteristic values or performance graphs are stored in memories of the control unit, than these characteristic values or performance graphs can be accessed at any time. A comparison with the measured cylinder pressure course, with knowledge of the engine-specifically present relationships, for instance also including ascertained mathematical relationships, yields a conclusion as to which of the valve control times is present. During engine operation, characteristic values can be adapted. From the adapted characteristic values, once again a conclusion as to the current valve control times can be drawn. A further evaluation option for the course of combustion pressure can also be obtained from the deviation from cycle to cycle in the variables characterizing combustion, in externally ignited engines, with an increasing residual gas content. This affords the opportunity of making a conclusion about the valve control times from the deviation in the characteristic values via engine-specifically ascertained performance graphs or characteristic curves, engine-specifically ascertained mathematical relationships, or characteristic values adapted during engine operation.

A combination of the aforementioned evaluation options can be made at any time. It is also possible, both in evaluating the pressure gradients and in evaluating the maximum pressure, the location of the maximum pressure, and in general in the evaluation of single pressure courses, first to perform averaging, for instance over multiple engine cycles, and then to examine the average values of the combustion chamber pressure course for variables that characterize certain valve control times. Once again, engine-specifically ascertained relationships, stored in memory as a performance graph or characteristic curve, or mathematical relationships should be taken into account. To detect at least one of the valve control times "outlet opens", "outlet closes", "inlet closes", "inlet opens", a defined combustion chamber pressure integral or a differential combustion chamber pressure integral can also initially be formed; the integration limits should be selected in a suitable way and in particular designed such that valve control time-typical phases are combined.

A further option for detecting the valve control times is to derive characteristic variables for certain valve control times from the occurrence of oscillations in the combustion chamber pressure course as a consequence of knocking combustion or from the necessity of counter provisions to avoid knocking combustion, which provisions are in turn taken on the basis of pressure oscillations in the course of the combustion chamber pressure. Once again, an additional averaging can be performed.

The invention can be used in engines with an arbitrary number of cylinders; the number of cylinder pressure sensors is for instance equal to the number of cylinders or to half the number of cylinders. In a simplified version, at least one sensor can be employed. As the sensors, knocking sensors can also be used, or arbitrary combustion sequence sensors, from whose output signal characteristic features for valve control times can be obtained.

What is claimed is:

1. A method for evaluating a combustion chamber pressure in an internal combustion engine having at least one cylinder pressure sensor, which measures a cylinder pressure, and one crankshaft angle sensor, which outputs a signal representative of a crankshaft position, and one evaluation device, including at least one microprocessor, to which signals of the sensors are supplied, in which the microprocessor, from a course of the combustion chamber pressure as a function of the crankshaft angle position, concludes that at least one of valve control times "outlet opens", "outlet closes", "inlet opens", "inlet closes" exists with respect to the crankshaft angle position, characterized in that measurements are performed during normal engine operation, and incident combustion chamber pressure courses or events which depend on the combustion chamber pressure course and which characterize the valve control times are evaluated.

2. The method of claim 1, characterized in that it is concluded that the valve control time "outlet opens" exists, if an expansion line of the course of combustion chamber pressure is varying in such a way that a change in the pressure gradient changes its sign with increasing volume or with an increasing crankshaft angle.

3. The method of claim 1, characterized in that to detect "inlet closes", a volume or the crankshaft angle at which a compression pressure is equal to a pressure that prevailed during an expulsion at a same distance from top dead center is detected.

4. The method of claim 1 or 2, characterized in that to ascertain the valve control time "inlet closes", a volume or the crankshaft angle at which the compression pressure is equal to an ambient pressure is detected.

5. The method of claim 1 or 2, characterized in that to detect the valve control time "inlet closes", a volume or the crankshaft angle at which the compression pressure is equal to a predeterminable fixed pressure is detected.

6. The method of claim 1, characterized in that to determine the valve control times "outlet closes", "inlet closes" or "inlet opens", an absolute pressure level during a compression before an onset of combustion is evaluated, and either from a single pressure course or from a pressure course averaged over multiple cycles, by comparison with engine-specifically ascertained data stored in memory in form of a performance graph or characteristic curve or engine-specifically ascertained mathematical relationships or adapted conversion factors, a conclusion as to the valve control times is drawn.

7. The method of claim 1, characterized in that to detect at least one valve control time, a combustion pressure gradient during a compression before an onset of combustion or a polytropic exponent calculated from it is evaluated, and from a single pressure course or from a pressure course averaged over multiple cycles, via engine-specifically ascertained conversions stored in memory in form of a performance graph or characteristic curve or engine-specifically ascertained mathematical relationships or adapted conversion factors, a conclusion as to the valve control time is drawn.

8. The method of claim 1, characterized in that from an absolute pressure level or from a pressure gradient during an expansion before opening of the outlet valve or from a polytropic exponent calculated from pressure gradients, either from a single pressure course or from a pressure course averaged over multiple cycles, via engine-specifically ascertained conversions stored in memory in form of a performance graph or characteristic curve, engine-specifically ascertained mathematical relationships or adapted conversion factors, a conclusion is drawn as to the valve control times "outlet closes", "inlet opens" or "inlet closes".

9. The method of claim 1, characterized in that from a location of a maximum pressure increase, either from a single pressure course or from a pressure course averaged over multiple cycles, via engine-specifically ascertained conversions stored in memory in form of a performance graph or characteristic curve, engine-specifically ascertained mathematical relationships or adapted conversion factors, a conclusion is drawn as to the valve control times "outlet closes", "inlet opens" or "inlet closes".

10. The method of claim 1, characterized in that to detect the valve control times, at least one of the following variables is employed:

deviation of a location of the maximum pressure increase over multiple cycles, a maximum incident pressure gradient from a single pressure course or from a pressure course averaged over multiple cycles;

deviation of the maximum incident pressure gradient over multiple cycles;

location of the maximum pressure from a single pressure course or from a pressure course averaged over multiple cycles;

deviation of the location of the maximum pressure over multiple cycles;

level of the maximum pressure from a single pressure course or from a pressure course averaged over multiple cycles;

deviation of the location of the maximum pressure over multiple cycles;

wherein additionally, engine-specifically ascertained conversions stored in memory in form of a performance graph or characteristic curve, engine-specifically ascertained mathematical relationships or adapted conversion factors are also taken into account to determine the valve control times.

11. The method of claim 1, characterized in that a conclusion as to the valve control times is drawn from one of the following variables:

deviation of a location of certain portions of the energy conversion over multiple cycles;

location of a maximum energy conversion from a single pressure course or from a pressure course averaged over multiple cycles;

deviation of the location of the maximum energy conversion over multiple cycles;

maximum gradient of the energy conversion from a single pressure course or from a pressure course averaged over multiple cycles;

and taking into account engine-specifically ascertained conversions stored in memory in form of a performance graph or characteristic curve, engine-specifically ascertained mathematical relationships or adapted conversion factors.

12. The method of claim 1, characterized in that one of the following variables is evaluated:

indicated work from a single pressure course or from a pressure course averaged over multiple cycles;

deviation in the indicated work over multiple cycles;

indicated high-pressure work from a single pressure course or from a pressure course averaged over multiple cycles;

deviation of the indicated high-pressure work over multiple cycles;

indicated low-pressure work from a single pressure course or from a pressure course averaged over multiple cycles;

deviation in the indicated low-pressure work over multiple cycles, and a conclusion as to the valve control times is drawn via engine-specifically ascertained conversions stored in memory in form of a performance graph or characteristic curve, engine-specifically ascertained mathematical relationships or adapted conversion factors.

13. The method of claim 1, characterized in that the combustion chamber pressure is integrated over a predeterminable range, or that a differential combustion chamber pressure is integrated over a predeterminable range, and either an integral from a single pressure course or from a pressure course averaged over multiple cycles is formed, and a conclusion as to the valve control times is drawn via engine-specifically ascertained conversions stored in memory in form of a performance graph or characteristic curve, engine-specifically ascertained mathematical relationships or adapted conversion factors.

14. The method of claim 13, characterized in that from the deviation in the integral or integrals over multiple cycles, a conclusion as to the valve control times is drawn.

15. The method of claim 1, characterized in that from an occurrence of oscillations in the course of the combustion chamber pressure caused by knocking combustion or from a necessity of counterprovisions to avoid knocking combustion, which in turn are taken on a basis of pressure oscillations in the course of the combustion chamber pressure, a conclusion as to the valve control times is drawn either from a single pressure course or from a pressure course averaged over multiple cycles, via engine-specifically ascertained conversions stored in memory in form of a performance graph or characteristic curve, engine-specifically ascertained mathematical relationships or adapted conversion factors.

* * * * *